United States Patent
Kalker et al.

(10) Patent No.: US 7,168,083 B2
(45) Date of Patent: Jan. 23, 2007

(54) CONTENT MONITORING

(75) Inventors: Antonius Adrianus Cornelis Maria Kalker, Eindhoven (NL); Job Cornelis Oostveen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 833 days.

(21) Appl. No.: 09/908,597

(22) Filed: Jul. 19, 2001

(65) Prior Publication Data

US 2002/0059580 A1 May 16, 2002

(30) Foreign Application Priority Data

Jul. 21, 2000 (EP) .................................. 00202646

(51) Int. Cl.
*H04N 9/00* (2006.01)
(52) U.S. Cl. ........................................ 725/19
(58) Field of Classification Search .................. 725/19, 725/20
See application file for complete search history.

(56) References Cited

U.S. PATENT DOCUMENTS 5,481,294 A 1/1996 Thomas et al. ................. 348/1

FOREIGN PATENT DOCUMENTS

| GB | 2258065 A | * | 1/1993 |
| WO | 9945705 A2 | | 9/1999 |
| WO | WO9959275 | | 11/1999 |

* cited by examiner

*Primary Examiner*—Andrew Y. Koenig
(74) *Attorney, Agent, or Firm*—Larry Liberchuk

(57) ABSTRACT

A method and arrangement are disclosed for distributing multimedia content such that that the actual distribution of said content can be monitored in an efficient and reliable manner. The invention combines the extensiveness of feature extraction and the robustness of watermarking. Characteristic features of the content, e.g. luminance distribution, are extracted (11) to constitute a signature (SIG) of the content. In addition, a watermark is embedded (12) having a payload representing an index (ID) in a database (10) in which the content to be monitored is stored. The watermark serves as an index for limiting the database search needed for monitoring the signatures.

2 Claims, 1 Drawing Sheet

CONTENT MONITORING

FIELD OF THE INVENTION

The invention relates to a method and a system for distributing media content such as audio and/or video programs. The invention also relates to a method and a system for monitoring the distribution of such media content.

BACKGROUND OF THE INVENTION

Producers of audiovisual content, such as television broadcasters or advertisers, are often interested in having knowledge as to whether, where and when their work is distributed. To this end, "broadcast monitoring" systems have been developed recently.

In one known broadcast monitoring method, sometimes referred to as active monitoring, a watermark is embedded in the video content. The payload in the watermark is a pointer to a database entry corresponding to the video sequence (e.g. a clip, a movie scene, a commercial). The watermark is retrieved and used to identify the content. A problem of this method is that a large payload is necessary for exploiting a large database. Such a large payload is difficult to embed in an imperceptible and unobtrusive manner.

In another known broadcast monitoring method, referred to as passive monitoring, so-called robust features are extracted from the content. Robust features are variables computed from the content, which remain more or less unchanged as long as the scene does not change too much. For every scene there is a unique set of robust features. For example, video pictures are divided into blocks. Each block is represented by a bit indicating whether the luminance of said block is higher or lower than a given reference value (e.g. the luminance of the neighboring block). The bit string corresponding to the robust features is then used as a signature for the particular scene in the database. A problem of this method is that the bit string extracted at the monitoring end may be slightly different from the signature in the database. This makes it difficult to search the signature in the database which most closely resembles the extracted bit string. Moreover, the signature is not necessarily unique.

OBJECT AND SUMMARY OF THE INVENTION

It is an object of the invention to improve the robustness and efficiency of content monitoring.

To this end, the invention provides a method and a system for distributing media content and for monitoring said media content as defined in the appended claims.

The current invention is an inventive combination of the prior-art schemes. The media content is watermarked with a relatively small payload giving information on that section of the database in which the content is to be searched. The robust signature is then used for a search within said section. The embedded watermark thus serves as an index for restricting the database search. It is achieved with the invention that the embedded watermark can be relatively small and thus robust. At the same time, the database search problem is reduced in complexity.

For example, the database may contain scenes of a large number of movies. The watermark indicates which movie a given scene belongs to. The extracted signature is then used to find the particular scene from that movie.

DESCRIPTION OF EMBODIMENTS

Figure 1:
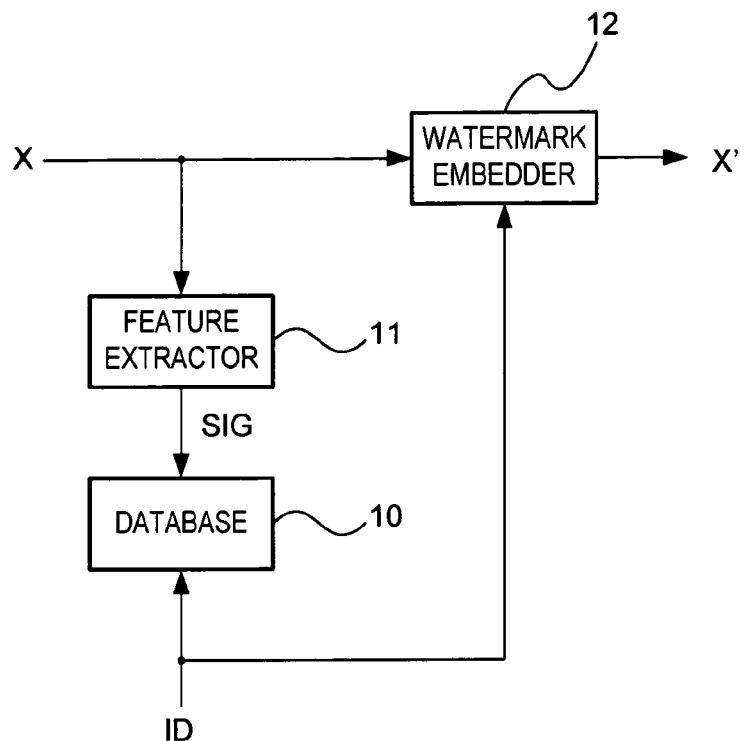
FIG. 1 shows a schematic diagram of a system for distributing media content in accordance with the invention.

In FIG. 1, a signal X represents media content, for example, a video scene. The video scene may be a particular news item produced by the BBC, or a commercial of company A. The BBC wants to trace broadcasts of its news item by other broadcasters. Company A wants to check whether its expensive commercial has indeed been broadcast at prime time through the TV stations of network B. Similar considerations apply to other distribution networks such as the Internet.

At the distribution end the system comprises a database 10, a feature extractor 11, and a watermark embedder 12. The feature extractor 11 extracts a signature SIG from the actual video content. For example, the video pictures are divided into blocks. Each block is represented by a bit indicating whether the luminance of said block is higher or lower than the luminance of the neighboring block. However, it will be appreciated that an infinite number of alternative embodiments of feature extractor 11 can be designed by a person skilled in the art. Similar features can be extracted from an audio signal, for example, a digitized version of the actual frequency spectrum.

The bit string thus generated by the feature extractor 11 constitutes a signature SIG. The signature SIG is applied to the database 10 and stored in a field of a record corresponding to the news item or commercial. The relevant record in the database is given a unique ID. Said ID is applied to the watermark embedder 12 and encoded as payload of a watermark. An example of such a watermark embedder having the capability to convey a multi-bit payload is disclosed in International Patent Application WO 99/45705. The watermarked content X' is then broadcast or otherwise distributed.

Figure 2:
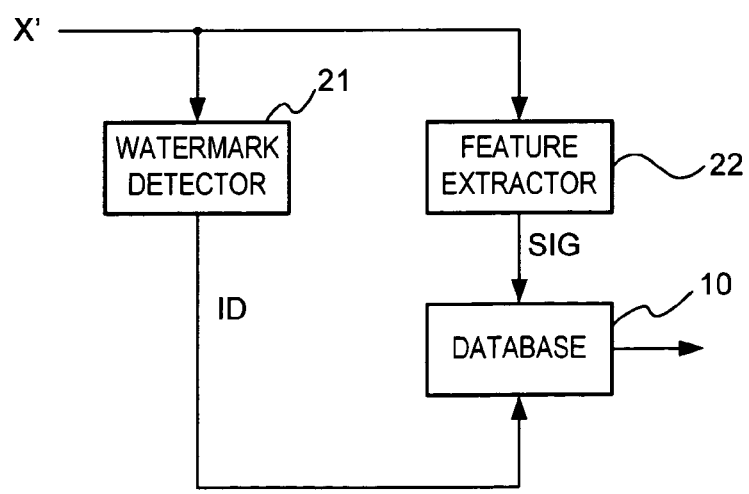
FIG. 2 shows a schematic diagram of a system for monitoring the distribution of said media content in accordance with the invention.

The arrangement shown in FIG. 2 monitors the relevant distribution channel. It receives the content X' and comprises a watermark detector 21 and a feature extractor 22. The arrangement is coupled to the database 10. Note that this is not necessarily a real-time connection. The watermark detector 21 detects the embedded watermark and, if the watermark is found, decodes its payload ID. An example is disclosed in International Patent Application WO 99/45705. The feature extractor 22 performs the same operation as feature extractor 11 in FIG. 1. It will be appreciated that the extractor is designed in such a way that the robust features of the content are not affected by the embedded watermark.

The decoded watermark payload ID and the signature SIG are applied to the database. Because the watermark provides a reliable data channel, the decoded payload may be assumed to be identical to the ID embedded by the arrangement which is shown in FIG. 1. The search for the signature SIG in the database (or the search for a closely resembling signature in view of possible changes caused by processing and transmission) can be limited to those records having the relevant ID. In database terminology: the ID serves as an index for limiting the database search.

A method and arrangement are disclosed for distributing multimedia content such that the actual distribution of said content can be monitored in an efficient and reliable manner. The invention combines the extensiveness of feature extraction and the robustness of watermarking. Characteristic features of the content, e.g. luminance distribution, are extracted (11) to constitute a signature (SIG) of the content. In addition, a watermark is embedded (12) having a payload representing an index (ID) in a database (10) in which the content to be monitored is stored. The watermark serves as an index for limiting the database search needed for monitoring the signatures.

The invention claimed is:

1. A method comprising:

providing a database having a plurality of database sections; and for each of a plurality of media content items, and for one of the database sections, extracting features of the media content item and generating a signature representing the extracted features;

storing a record corresponding to the media content item in the database section, the record including the signature; and generating a watermarked media content item by embedding in the media content item a watermark Identifying the database section.

2. A method comprising:

receiving a media content item having a watermark, the watermark identifying a database section in a database having a plurality of database sections, the identified database section being adapted to store a plurality of records, each record having a signature representing extracted features of a media content item;

extracting features of the received media content item, and generating a signature representing the features extracted from the received media content item; and searching the database section identified by the watermark for a record having the signature.

* * * * *